US012810533B2

(12) United States Patent
Ninan et al.

(10) Patent No.: US 12,810,533 B2
(45) Date of Patent: Nov. 24, 2026

(54) VOLUMETRIC IMMERSIVE EXPERIENCE WITH MULTIPLE VIEWS

(71) Applicant: Dolby Laboratories Licensing Corporation, San Francisco, CA (US)

(72) Inventors: Ajit Ninan, San Jose, CA (US); Gregory John Ward, Berkeley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 159 days.

(21) Appl. No.: 18/834,191

(22) PCT Filed: Jan. 30, 2023

(86) PCT No.: PCT/US2023/061542
§ 371 (c)(1),
(2) Date: Jul. 29, 2024

(87) PCT Pub. No.: WO2023/150482
PCT Pub. Date: Aug. 10, 2023

(65) Prior Publication Data

US 2025/0148699 A1 May 8, 2025

Related U.S. Application Data

(60) Provisional application No. 63/305,641, filed on Feb. 1, 2022.

(30) Foreign Application Priority Data

Feb. 10, 2022 (EP) .................................... 22156127

(51) Int. Cl.
*G06T 15/20* (2011.01)

(52) U.S. Cl.
CPC .................................... *G06T 15/20* (2013.01)

(58) Field of Classification Search
None
See application file for complete search history.

(56) References Cited

U.S. PATENT DOCUMENTS 8,339,475 B2 12/2012 Atanassov
9,621,767 B1 4/2017 El Mezeni
(Continued)

FOREIGN PATENT DOCUMENTS

EP 2993886 A1 3/2016
EP 3295451 B1 7/2020
(Continued)

OTHER PUBLICATIONS

ITU Rec. ITU-R BT. 1886, "Reference electro-optical transfer function for flat panel displays used in HDTV studio production," (Mar. 2011), 7 pages.
(Continued)

*Primary Examiner* — Anh-Tuan V Nguyen

(57) ABSTRACT

A multi-view input image covering multiple sampled views is received. A multi-view layered image stack is generated from the multi-view input image. A target view of a viewer to an image space depicted by the multi-view input image is determined based on user pose data. The target view is used to select user pose selected sampled views from among the multiple sampled views. Layered images for the user pose selected sampled views, along with alpha maps and beta scale maps for the user pose selected sampled views are encoded into a video signal to cause a recipient device of the video signal to generate a display image for rendering on the image display.

14 Claims, 11 Drawing Sheets

(56) References Cited

U.S. PATENT DOCUMENTS

| | | | | |
|---|---|---|---|---|
| 9,961,237 | B2 | 5/2018 | Atkins | |
| 10,080,026 | B2 | 9/2018 | Su | |
| 10,244,244 | B2 | 3/2019 | Piramanayagam | |
| 10,249,263 | B2 | 4/2019 | Hendry | |
| 10,332,481 | B2 | 6/2019 | Atkins | |
| 10,536,692 | B2 | 1/2020 | Huang | |
| 10,609,395 | B2 | 3/2020 | Kerofsky | |
| 10,645,403 | B2 | 5/2020 | Song | |
| 10,652,579 | B2 | 5/2020 | Lakshman | |
| 10,659,749 | B2 | 5/2020 | Kadu | |
| 10,992,941 | B2 | 4/2021 | Lu | |
| 11,158,026 | B1 * | 10/2021 | Kamal | H04N 13/239 |
| 2005/0094729 | A1 * | 5/2005 | Yuan | H04N 19/61 375/240.03 |
| 2012/0147953 | A1 | 6/2012 | El-Mahdy | |
| 2013/0335438 | A1 * | 12/2013 | Ward | G06T 5/90 345/589 |
| 2014/0003527 | A1 | 1/2014 | Tourapis | |
| 2016/0295220 | A1 | 10/2016 | Oh | |
| 2017/0357327 | A1 * | 12/2017 | Dimitrov | G06F 3/012 |
| 2018/0359489 | A1 * | 12/2018 | Lakshman | H04N 19/597 |
| 2019/0104324 | A1 * | 4/2019 | Han | H04N 21/234 |
| 2019/0311694 | A1 | 10/2019 | Van Mourik | |
| 2020/0351524 | A1 | 11/2020 | Lee et al. | |
| 2020/0382802 | A1 | 12/2020 | Atkins | |
| 2021/0166353 | A1 * | 6/2021 | Chen | G06T 5/50 |
| 2025/0133224 | A1 | 4/2025 | Ninan | |

FOREIGN PATENT DOCUMENTS

| | | | |
|---|---|---|---|
| IN | 201641015395 | A | 11/2017 |
| WO | 2019199701 | A1 | 10/2019 |
| WO | 2019217751 | W | 11/2019 |
| WO | 2020219341 | A1 | 10/2020 |
| WO | 2023150074 | A1 | 8/2023 |

OTHER PUBLICATIONS

ITU Rec. ITU-R BT.2020-2 "Parameter values for ultra-high definition television systems for production and international programme exchange", Oct. 2015 (Oct. 1, 2015), 8 pages.

Rec. ITU-R BT.2100 "Image parameter values for high dynamic range television for use in production and international programme exchange", Jun. 2017 (Jun. 1, 2017), 16 pages.

Scott et al., Multi-plane Image Video Compression, 2020 IEEE 22nd International Workshop Multimedia Signal Processing (MMSP), Sep. 21, 2020 (Sep. 21, 2020), pp. 1-6, 6 pages.

SMPTE ST 2084:2014 "High Dynamic Range EOTF of Mastering Reference Displays", 15 pages.

* cited by examiner

VOLUMETRIC IMMERSIVE EXPERIENCE WITH MULTIPLE VIEWS

CROSS-REFERENCE TO RELATED APPLICATIONS

This application is a U.S. National Stage application under U.S.C. 371 of International Application No. PCT/US2023/061542, filed on Jan. 30, 2023, which claims priority of the following priority applications: U.S. provisional application 63/305,641 (reference: D21071USP1), filed 1 Feb. 2022, and European Patent Application No. 22156127.7, filed 10 Feb. 2022, each of which is hereby incorporated by reference in its entirety.

TECHNOLOGY

The present invention relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g., interchangeably.

As used herein, the term high dynamic range (HDR) relates to a DR breadth that spans the some 14-15 or more orders of magnitude of the HVS. In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a viewer or the HVS that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components/channels (e.g., luma Y and chroma Cb and Cr) of a color space, where each color component/channel is represented by a precision of n-bits per pixel (e.g., n=8). Using non-linear luminance coding (e.g., gamma encoding), images where $n \leq 8$ (e.g., color 24-bit JPEG images) are considered images of standard dynamic range, while images where $n > 8$ may be considered images of enhanced dynamic range.

A reference electro-optical transfer function (EOTF) for a given display characterizes the relationship between color values (e.g., luminance, represented in a codeword among codewords representing an image, etc.) of an input video signal to output screen color values (e.g., screen luminance, represented in a display drive value among display drive values used to render the image, etc.) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The HVS responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2044:2014 *"High Dynamic Range EOTF of Mastering Reference Displays"* (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 302 to 1.000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). Example (e.g., HDR, Hybrid Log Gamma or HLG, etc.) EOTFs are defined in SMPTE 2044 and Rec. ITU-R BT.2060, *"Image parameter values for high dynamic range television for use in production and international programme exchange,"* (June 2017). See also ITU Rec. ITU-R BT.3040-2. *"Parameter values for ultra-high definition television systems for production and international programme exchange,"* (October 2015), which is incorporated herein by reference in its entirety and relates to Rec. 3040 or BT. 3040 color space. As appreciated by the inventors here, improved techniques for coding high quality video content data for immersive user experience to be rendered with a wide variety of display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
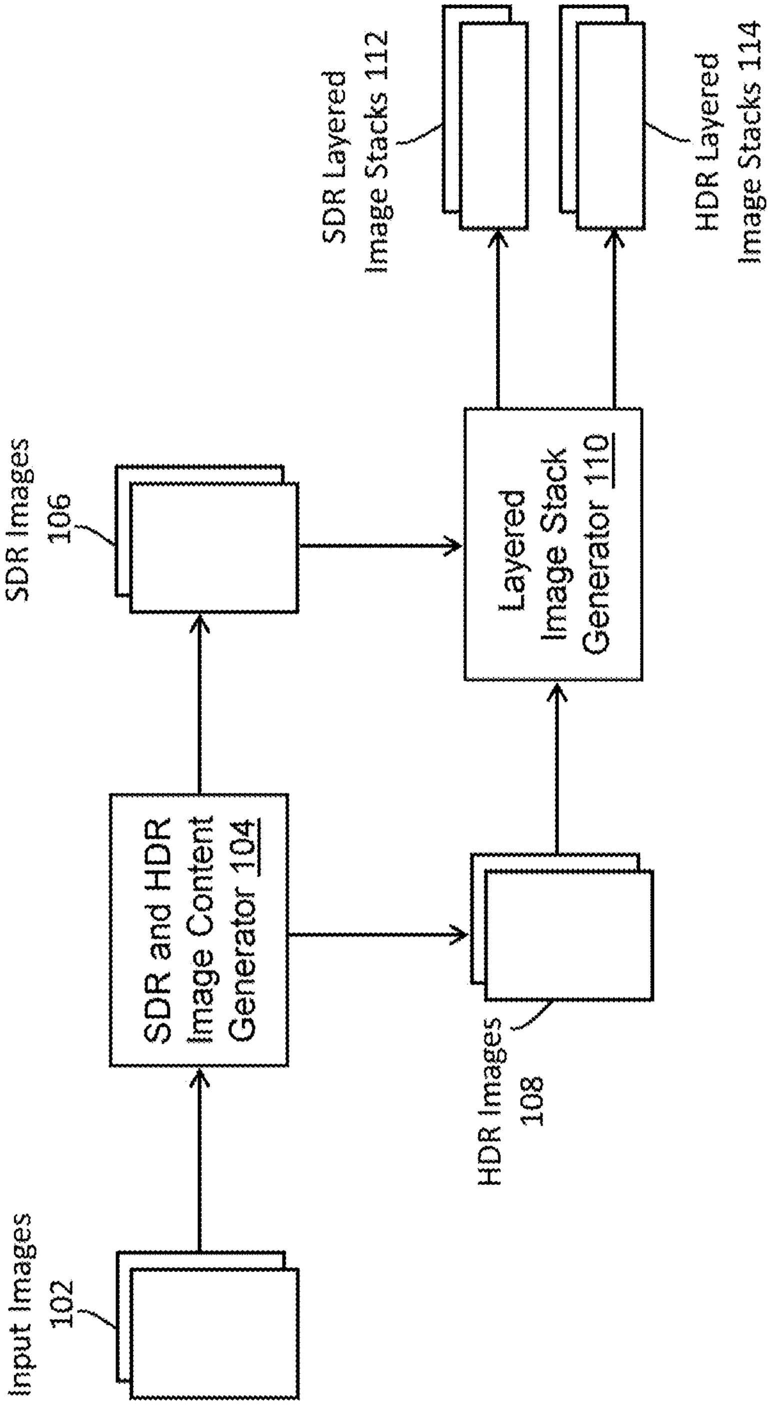
FIG. 1A illustrates an example image process flow for generating layered image stacks.

Example embodiments, which relate to volumetric immersive experience with multiple views, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MULTI-VIEW IMAGE DATA REPRESENTATION AND DELIVERY
3. STREAMING USER POSE SELECTED LAYERED IMAGES
4. USER POSE SELECTED SAMPLED VIEWS
5. EXAMPLE PROCESS FLOWS
6. IMPLEMENTATION MECHANISMS-HARDWARE OVERVIEW
7. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to support volumetric immersive experience with image data that covers or represents multiple sampled views. An upstream device can receive a sequence of multi-view input images as input. Each multi-view input image in the sequence covers multiple sampled views for a time point in a sequence of consecutive time points. The upstream device can generate a sequence of layered image stacks from the sequence of multi-view input images to support efficient video coding to support volumetric immersive experience.

Each layered image stack in the sequence of layered image stacks may, but is not limited to, include a stack of layered images, alpha maps, beta scale maps, etc. The layered images in each such layered image stack may comprise a plurality of SDR layered images covering or representing a plurality of sampled views for a time point in the sequence of consecutive time points.

Each SDR layered image in the plurality of SDR layered images in the layered image stack corresponds to, or covers, a respective sampled view in the plurality of sampled views and includes one or more (e.g., 16, 32, etc.) SDR image layers (or one or more image pieces) at different depths sub-ranges in a plurality of mutually exclusive depth sub-ranges that cover the entire depth range relative to the respective sampled view.

An alpha map as described herein comprises alpha values stored in a data frame or a (e.g., two-dimensional, etc.) array. The alpha values can be used in alpha compositing operations to consolidate multiple image layers of different depths or different depth sub-ranges. For example, an alpha map for the SDR layered image of the respective sampled view comprises alpha values that can be used to perform alpha compositing operations on the SDR image layers to generate an SDR unlayered (or single layer) image from the image layers of the SDR layered image as viewed from the respective sampled view. As used herein, an unlayered (or single layer) image refers to an image that has not been partitioned into multiple image layers.

A beta scale map as described herein comprises beta scaling data stored in a data frame or a (e.g., two-dimensional, etc.) array. The beta scaling data can be used in scaling operations that aggregate other image processing operations such as reshaping operations that convert an input image of a first dynamic range into an output image of a second dynamic range different from the first dynamic range. For example, a beta scale map for the SDR layered image of the respective sampled view comprises beta scaling data used to perform scaling operations such as selecting scaling methods and applying scaling with operational parameters defined or specified in the beta scaling data on the SDR image layers to generate one or more corresponding HDR image layers for the respective sampled view. Additionally, optionally or alternatively, these HDR image layers can be alpha composited using the same alpha values in the alpha map into an HDR unlayered (or single layer) image as viewed from the respective sampled view.

Real time or near real time view positions and/or view directions of a viewer/user to an image display can be monitored or tracked using real time or near real time user pose data collected while display images derived from layered image stacks as described herein are contemporaneously being rendered to the viewer/user are tracked on the image display. The user pose data may be generated as results from applying machine learning (ML) based face tracking, face detection and user pose analysis to images of the viewer/user captured in real time or near real time with a camera in a fixed spatial position relative to the image display while the viewer/user is viewing rendered image content on the image display.

A real time or near real time target view (e.g., a novel view not covered by any sampled view, etc.) of the viewer/user for a given time point may be determined based on the user pose data.

The upstream device can use the target view of the viewer/user to select a subset of SDR layered images—from a plurality of SDR layered images in a layered image stack for the given time point—that covers a subset of sampled views, which may be referred to as a set of user pose selected sampled views. In some operational scenarios, the set of user pose selected sampled views may include the closest sampled views to the target view of the viewer/user. Additionally, optionally or alternatively, the set of user pose selected sampled views can include one or more reference sampled views such as corresponding to a center of symmetry or furthest views, which may be used to provide reference or additional information to depth data generation or hole filling operations with respect to newly disoccluded image details present in the closest sampled views.

A downstream recipient device may receive and decode a video signal encoded with user pose selected layered images for the set of user pose selected sampled views, alpha maps and beta scale maps for the user pose selected layered images, etc. Based on a current view of the viewer/user alpha values in the alpha maps can be adjusted from the user pose selected sampled views to the current view of the viewer/user into adjusted alpha values constituting adjusted alpha maps. The current view of the viewer/user may be the same as the target view used to select the user pose selected sampled views or (e.g., slightly, moved, etc.) a different view from the target view.

SDR images of the current view may be generated or reconstructed from SDR image layers of the set of user pose selected sampled views using alpha compositing operations based on the adjusted alpha values in the adjusted alpha maps. These SDR images may be blended into a final SDR unlayered (or single layer) image and used to generate SDR display images for rendering on the image display if the image display operates to render SDR video content.

HDR image layers for the set of user pose selected sampled views may be generated or reconstructed from SDR image layers of the set of user pose selected sampled views using beta scaling operations. In addition, HDR images of the current view may be generated or reconstructed from HDR image layers of the set of user pose selected sampled views using alpha compositing operations based on the adjusted alpha values in the adjusted alpha maps. These HDR images may be blended into a final HDR unlayered (or single layer) image and used to generate HDR display images for rendering on the image display if the image display operates to render HDR video content.

Example embodiments described herein relate to encoding image content. A multi-view input image is received. The multi-view input image covers a plurality of sampled views to an image space depicted in the multi-view input image. A multi-view layered image stack of a plurality of layered images of a first dynamic range for the plurality of sampled views, a plurality of alpha maps for the plurality of layered images, and a plurality of beta scale maps for the plurality of layered images, are generated from the multi-view input image. A target view of a viewer to the image space is determined based at least in part on a user pose data portion generated from a user pose tracking data collected while the viewer is viewing rendered images on an image display. The target view of the viewer is used to select a set of user pose selected sampled views from among the plurality of sampled views represented in the multi-view input image. A set of layered images for the set of user pose selected sampled views in the plurality of layered images of the multi-view layered image stack, along with a set of alpha maps for the set of user pose selected sampled views in the plurality of alpha maps of the multi-view layered image stack and a set of beta scale maps for the set of user pose selected sampled views in the plurality of beta scale maps of the multi-view layered image stack, is encoded into a video signal to cause a recipient device of the video signal to generate a display image from the set of layered images for rendering on the image display.

Example embodiments described herein relate to decoding image content. A set of layered images of a first dynamic range for a set of user pose selected sampled views is decoded from a video signal. The set of user pose selected sampled views has been selected based on user pose data from a plurality of sampled views covered by a multi-view source image. The multi-view source image has been used to generate a corresponding multi-view layered image stack. The corresponding multi-view layered image has been used to generate the set of layered images. A set of alpha maps for the set of user pose selected sampled views is decoded from the video signal. A current view of a viewer is used to adjust alpha values in the set of alpha maps for the set of user pose selected sampled views to generate adjusted alpha values in a set of adjusted alpha maps for the current view. A display image is caused to be derived from the set of layered images and the set of adjusted alpha maps to be rendered on a target image display.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Multi-View Image Data Representation and Delivery

FIG. 1A illustrates an example image process flow for generating layered image stacks. This process flow can be implemented as a part of an upstream image processing device such as an encoder device or a video streaming server. Additionally, optionally or alternatively, the process flow can be implemented in a separate or attendant device such as an image pre-processing device operating in conjunction with an encoder device or a video streaming server. Some or all of the process flow may be implemented or performed with one or more of: computing processors, audio and video codecs, such as those defined by ATSC, DVB, DVD, Blu-Ray, and other delivery formats, digital signal processors, graphic processing units or GPUs, etc.

An SDR and HDR image content generator block 104 comprises software, hardware, a combination of software and hardware, etc., configured to receive a sequence of (e.g., time consecutive, sequential, multi-view, etc.) input or source images 102. These input images (102) may be received from a video source or retrieved from a video data store. The input images (102) may be digitally captured (e.g., by a digital camera, etc.), generated by converting analog camera pictures captured on film to a digital format, generated by a computer (e.g., using computer animation, image rendering, etc.), and so forth. The input images (102) may be images relating to one or more of: movie releases, archived media programs, media program libraries, video recordings/clips, media programs, TV programs, user-generated video contents, etc.

The SDR and HDR image content generator block (104) can perform image content mapping operations on the sequence of input images (102) to generate a corresponding sequence of SDR images 106 depicting the same visual content as the input images (102) as well as a corresponding sequence of HDR images 108 depicting the same visual content as the sequence of input images (102). Example image content mapping operations may include some or all of: video editing operations, video transformation operations, color grading operations, dynamic range mapping operations, local and/global reshaping operations, display management operations, video special effect operations, and so on.

Some or all of these operations can be performed automatically (e.g., using content mapping tool, color grading toolkit, etc.) with no human input. Additionally, optionally or alternatively, some or all of these operations can be performed manually, automatically with human input, etc.

By way of example but not limitation, the HDR images (108)—which may be of a relatively high dynamic range (or brightness range)—may be generated first from the input images (102) using some or all of these image processing operations including color grading operations performed fully automatically or partly automatically with human input. Local and/or global reshaping operations may be (e.g., automatically without human input, etc.) performed on the HDR images (108)—as generated from the input images (102)—to generate the SDR images (106), which may be of a relatively narrow dynamic range (or brightness range).

A layered image stack generator 110 comprises software, hardware, a combination of software and hardware, etc., configured to receive the HDR images (108) and the SDR images (106)—depicting the same visual content but with different dynamic ranges—as input to generate a corresponding sequence of HDR layered image stacks 114 depicting the same visual content as well as a corresponding sequence of SDR layered image stacks 112 depicting the same visual content.

In some operational scenarios, an input image—and/or a derivative image such as a corresponding HDR or SDR image depicting the same visual content as the input image—as described herein may be a multi-view image, for example, for a given time point in a plurality or sequence of (e.g., consecutive, etc.) time points over a time interval or duration covered by the sequence of input images (102). The multi-view input image comprises image data for each sampled view in a plurality of sampled views. The image data for each such sampled view in the plurality of sampled views represents a single-view image for a plurality of single-view images in the multi-view image. The plurality of single-view images in the multi-view image may respectively (e.g., one-to-one, etc.) correspond to the plurality of sampled views represented in the multi-view image. Image data for each sampled view in the plurality of sampled views in the multi-view image may be represented as pixel values in an image frame.

For example, input image data for each sampled view in the plurality of sampled views represented in the multi-view input image may be represented as input pixel values in an input image frame (or single-view input image). The input image data for each such sampled view in the plurality of sampled views covered by the multi-view input image represents a single-view input image for a plurality of single-view input images in the multi-view input image. The plurality of single-view input images in the multi-view input image may respectively (e.g., one-to-one, etc.) correspond to the plurality of sampled views represented in the multi-view input image.

Similarly. HDR image data for each sampled view in the plurality of sampled views-which may be the same as the plurality of sampled views represented in the multi-view input image used to directly or indirectly derive the multi-view HDR image-represented in the corresponding multi-view HDR image (e.g., one of the HDR images (108)) may be represented as HDR pixel values in an HDR image frame (or single-view HDR image). The HDR image data for each such sampled view in the plurality of sampled views covered by the multi-view HDR image represents a single-view HDR image for a plurality of single-view HDR images in the multi-view HDR image. The plurality of single-view HDR images in the multi-view HDR image may respectively (e.g., one-to-one, etc.) correspond to the plurality of sampled views represented in the multi-view HDR image.

SDR image data for each sampled view in the plurality of sampled views-which may be the same as the plurality of sampled views represented in the multi-view input image used to directly or indirectly derive the multi-view SDR image-represented in the corresponding multi-view SDR image (e.g., one of the SDR images (106)) may be represented as SDR pixel values in an SDR image frame (or single-view SDR image). The SDR image data for each such sampled view in the plurality of sampled views covered by the multi-view SDR image represents a single-view SDR image for a plurality of single-view SDR images in the multi-view SDR image. The plurality of single-view SDR images in the multi-view SDR image may respectively (e.g., one-to-one, etc.) correspond to the plurality of sampled views represented in the multi-view SDR image.

A single-view HDR image and a single-view SDR image, both of which are directly or indirectly derived or generated from the same single-view input image, may be of the same sampled view and the same (e.g., planar, spherical, etc.) spatial dimension and/or the same spatial resolution with one-to-one pixel correspondence. Additionally, optionally or alternatively, a single-view HDR image and a single-view SDR image, both of which are directly or indirectly derived or generated from the same single-view input image, may be of the same sampled view but different spatial dimensions and/or different spatial resolutions with many-to-one pixel correspondence (as determined by downsampling or upsampling factors).

In some operational scenarios, the layered image stack generator (110) may turn a multi-view SDR image in the sequence of SDR images (106) into an SDR layered image stack in the sequence of SDR layered image stacks (112). The SDR layered image stack covers the plurality of sampled views covered in the multi-view SDR image. More specifically, the SDR layered image stack comprises a plurality of single-view layered images each of which covers a respective sampled view in the plurality of sampled views.

Each single-view layered image in the plurality of single-view layered images in the SDR layered image stack may be derived or generated from a respective single-view SDR image in a plurality of single-view SDR images in the multi-view SDR image. The single-view layered image may comprise image layer data in one or more image layers.

In some operational scenarios, instead of placing all image data of the respective single-view SDR image in a single image layer, the image data of the respective single-view SDR image may be partitioned (e.g., physically, logically, using different buffers, using a buffering order, etc.) into multiple image data portions—or multiple sets of image layer data—respectively in multiple image layers.

An image space depicted or represented in the respective single-view SDR image may be logically partitioned into multiple image sub-spaces (e.g., along a depth direction in relation to a camera position/orientation, etc.). Different image data portions depicting image details/objects in different image sub-spaces—e.g., corresponding to different depths or different (mutually exclusive) depth sub-ranges—of the image space may be partitioned into different image layers of the multiple image layers. Each image layer in the multiple image layers may represent a respective image sub-space—e.g., corresponding to a respective depth or a respective depth sub-range—in the multiple image sub-spaces that are partitioned from the image space depicted or represented in the respective single-view SDR image.

Each image data portion in the multiple image data portions—or each set of image layer data in the multiple sets of image layer data—in the single-view SDR layered image derived or generated from the respective single-view SDR image may represent an image piece in a respective image sub-space in the multiple image sub-spaces of the image space depicted or represented by the single-view SDR layered image or the respective single-view SDR image.

To partition the image data in the respective single-view SDR image into the multiple sets of image layer data the multiple layers of the corresponding single-view SDR layered image, an alpha map may be generated by the layered image stack generator (110) to define or specify alpha values (e.g., transparency values, weight factors, alpha blending values, etc.) for each pixel in the respective single-view SDR image. These alpha values can be used in alpha compositing operations performed on the multiple sets of image layer data in the multiple image layers of the single-view SDR layered image to generate or recover the respective single-view SDR image that gives rise to the single-view SDR layered image. An example alpha compositing operation may be to composite from image layers of the furthest depths to the nearest depths based at least in part on the alpha values that indicate image layer ordering and opacities/transparencies of image layers, for example using an image compositing operation such as an "over" operator. Additionally, optionally or alternatively, image layer data of different image layers can be composited using alpha values as well as weight factors or blending values as defined in the alpha map to generate or recover (e.g., YCbCr, RGB, etc.) pixel values of the respective single-view SDR image as (e.g., normalized, etc.) weighted or blended sums or averages of corresponding pixel values in the multiple sets of image layer data in the single-view SDR layered image.

A single-view HDR image in a multi-view HDR image may correspond to the respective single-view SDR image in the multi-view SDR image. For example, the single-view HDR image and the respective single-view SDR image may be generated or derived from the same single-view input image in an input image giving rise to the multi-view SDR image and the multi-view HDR image.

In some operational scenarios, instead of directly partitioning the single-view HDR image into a corresponding HDR layered image, a system as described herein—or the SDR and HDR image content generator (104) or the layered image stack generator (110) therein—can generate a beta scale map comprising beta scaling data to scale the respective single-view SDR image into the single-view HDR image. Hence, the single-view HDR image can be represented as a combination of the respective single-view SDR image and the beta scale map.

The single-view HDR image may be partitioned into the same multiple image layers that are used to partition the respective single-view SDR image by way of partitioning the beta scale map into the multiple image layers, thereby generating or deriving a single-view HDR layered image corresponding to the single-view HDR image.

As a result, an SDR layered image stack as described herein corresponds to a multi-view input image and comprise a plurality of single-view SDR layered images each of which corresponds to a respective sampled view in a plurality of sampled views represented or covered in the multi-view input image. Each single-view SDR layered image in the plurality of single-view SDR layered images in the SDR layered image stack comprises multiple sets of SDR image layer data (or multiple image pieces of a single-view SDR (unlayered or pre-layered) image) and an alpha map that includes alpha compositing related data to perform alpha compositing operations on the multiple sets of image layer data to recover the single-view SDR (unlayered or pre-layered) image.

Correspondingly, an HDR layered image stack as described herein corresponds to the same multi-view input image and comprise a plurality of single-view HDR layered images each of which corresponds to a respective sampled view in a plurality of sampled views represented or covered in the multi-view input image. Each single-view HDR layered image in the plurality of single-view HDR layered images in the HDR layered image stack comprises the multiple sets of SDR image layer data (or multiple image pieces of a single-view SDR (unlayered or pre-layered) image), an alpha map, and a beta scale map. The alpha map includes alpha compositing related data for a single-view SDR image corresponding to or covering the same sampled view as the single-view SDR image. The beta scale map includes multiple sets of beta scaling related data respectively partitioned from a (pre-partitioned) beta scale map into the same multiple image layers as a single-view SDR layered image generated or derived from the single-view SDR image. These multiple sets of beta scaling related data can be used to perform beta scaling operations on multiple sets of SDR image layer data of the single-view SDR layered image to derive or generate corresponding multiple sets of HDR image layer data. The same alpha map used to composite the single-view SDR layered image into the single-view SDR image can be used to perform the same alpha compositing operations on the multiple sets of HDR image layer data to recover the single-view HDR (unlayered or pre-layered) image.

Beta scaling can be used to incorporate or implement in lieu of other image processing operations including but not limited to: any, some or all of: reshaping operations, content mapping with no or little human input, content mapping with human input, tone mapping, color space conversion, display mapping, PQ, non-PQ, linear or non-linear coding, image blending, image mixing, linear image mapping, non-linear image mapping, applying EOTF, applying EETF, applying OETF, spatial or temporal downsampling, spatial or temporal upsampling, spatial or temporal resampling, chroma sampling format conversion, etc.

Beta scaling operations as described herein can be implemented as simple scaling operations that apply (e.g., linear, etc.) multiplications and/or additions. Additionally, optionally or alternatively, beta scaling operations as described herein can be implemented in complex or non-linear scaling operations including but not limited to LUT-based scaling. The beta scaling operations may be performed only once at runtime to realize or produce (equivalent) effects of the other image processing operations in lieu of which the beta scaling operations are performed. As a result, relatively complicated image processing operations permeated through an image processing chain/pipeline/framework can be avoided or much simplified under beta scaling techniques as described herein.

Beta scaling as described herein can support global mapping (e.g., global tone mapping, global reshaping, etc.), local mapping (e.g., local tone mapping, local reshaping, etc.) or a combination of global and local mapping.

Example beta scaling operations can be found in U.S. patent application No. 63/305,626, with an application title of "BETA SCALE DYNAMIC DISPLAY MAPPING" by Ajit Ninan, Gregory Ward, filed on 1 Feb. 2022, the entire contents of which are hereby incorporated by reference as if fully set forth herein.

The layered image stack generator (110) may include a trained image layer prediction model implemented with one or more convolutional neural networks (CNNs).

Operational parameters for the CNNs in the image layer prediction model can be optimized in a model training phase with training (e.g., unlayered SDR, pre-layered SDR, etc.) images as well as ground truths represented by training image layers-partitioned from the training images, respectively, using training depth images—for the training images. The image layer prediction model can use a training image as input to the CNNs to generate predicted image layers (e.g., a corresponding predicted alpha mask, etc.) from the training image. Prediction errors or costs can be computed as differences or distances based on an error or cost function between the predicted image layers and ground truth represented by training image layers for the training image and back propagated to modify or optimize the operational parameters for the CNNs such as weights or biases of the CNNs. A plurality of training images can be used to train the CNNs into the trained image layer prediction model with the (e.g., final, etc.) optimized operational parameters.

The layered image stack generator (110) may be configured or downloaded with the optimized operational parameters for the CNNs of the trained image layer prediction model. The CNNs can receive a single-view image such as a single-view SDR image as input, generate features of the same types used in the training phase, use the features to generate or derive SDR image layers (e.g., a corresponding alpha mask, etc.) from the single-view SDR image.

3. Streaming User Pose Selected Layered Images

Figure 1B:
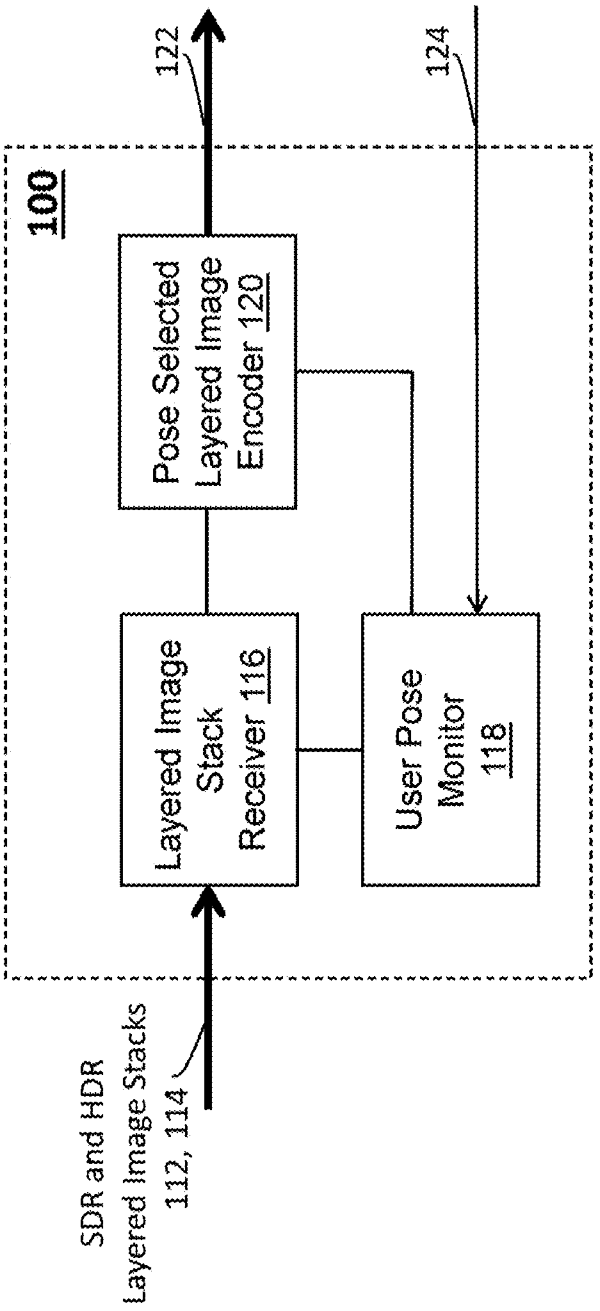
FIG. 1B illustrates an example upstream device.

FIG. 1B illustrates an example upstream device such as a video streaming server 100 that comprises a multi-view layered image stack receiver 116, a user pose monitor 118, a pose selected layered image encoder 120, etc. Some or all of the components of the video streaming server (100) may be implemented by one or more devices, modules, units, etc., in software, hardware, a combination of software and hardware, etc.

In some operational scenarios, the video streaming server (100) may include or implement the processing blocks of the process flow as illustrated in FIG. 1A. Additionally, optionally or alternatively, the video streaming server (100) may operate in conjunction with a separate upstream device that includes or implements the processing blocks of the process flow as illustrated in FIG. 1A.

The multi-view layered image stack receiver (116) comprises software, hardware, a combination of software and hardware, etc., configured to receive SDR and HDR layered image stacks (e.g., 112, 114, etc.) from an internal or external layered image stack source.

The (multi-view) SDR and HDR layered image stacks (112, 114) comprises a sequence of pairs of SDR and HDR layered image stacks depicting visual scenes in image spaces (e.g., three dimensional or 3D depicted space, etc.). Each pair of SDR and HDR layered image stacks in the sequence comprises an SDR layered image stack and an HDR layered image stack corresponding to the SDR layered image stack. Both the SDR layered image stack and the HDR layered image stack may depict the same visual content but with different dynamic (or brightness) ranges for or at a corresponding time point in a plurality of (e.g., consecutive, sequential, etc.) time points in a time interval or duration covered by or represented in the (multi-view) SDR and HDR layered image stacks (112, 114).

In some operational scenarios, the SDR layered image stack may include SDR layered images that cover a plurality of sampled views as well as respective alpha maps for the SDR layered images that can be used to composite the SDR layered images into (original, unlayered, pre-layered, single-layered) SDR images. Similarly, the HDR layered image stack may include HDR layered images that cover a plurality of sampled views as well as respective alpha maps (which may, but are not limited to, be the same as those for the SDR layered images) for the HDR layered images that can be used to composite the HDR layered images into (original, unlayered, pre-layered, single-layered) HDR images.

In some operational scenarios, the SDR layered image stack may include SDR layered images that cover a plurality of sampled views as well as respective alpha maps for the SDR layered images that can be used to composite the SDR layered images into (original, unlayered, pre-layered, single-layered) SDR images. However, the HDR layered image stack may not include either HDR layered images or SDR layered images. The HDR layered image stack may simply include references to the SDR layered images and the alpha maps that have already been included in the SDR layered image stack in the same pair as well as beta scale maps used to perform beta scaling operations on SDR pixel or codeword values in the SDR layered images into corresponding HDR layered images, which can be respectively converted into (original, unlayered, pre-layered, single-layered) HDR images using the same alpha maps used for compositing the SDR layered images into the (original, unlayered, pre-layered, single-layered) SDR images.

In some operational scenarios, the HDR layered image stack may include HDR layered images that cover a plurality of sampled views as well as respective alpha maps for the HDR layered images that can be used to composite the HDR layered images into (original, unlayered, pre-layered, single-layered) HDR images. However, the SDR layered image stack may not include either HDR layered images or SDR layered images. The SDR layered image stack may simply include references to the HDR layered images and the alpha maps that have already been included in the HDR layered image stack in the same pair as well as beta scale maps used to perform beta scaling operations on HDR pixel or codeword values in the HDR layered images into corresponding SDR layered images, which can be respectively converted into (original, unlayered, pre-layered, single-layered) SDR images using the same alpha maps used for compositing the HDR layered images into the (original, unlayered, pre-layered, single-layered) HDR images.

A plurality of sampled views represented in a multi-view image or a corresponding multi-view layered image stack as described herein may correspond to viewpoints or camera positions arranged or distributed spatially in a viewing surface or volume. By way of example but not limitation, the plurality of sampled views may correspond to different viewpoints or camera positions arranged or distributed spatially as vertexes of a grid in a two-dimensional plane.

Depth or disparity data can be generated (e.g., by a CNN implementing layered image (or image layer) generation or prediction, by the layered image stack generator (110), etc.) using pixel correspondence relationships among different images from different sampled views. For example, the depth or disparity data may be obtained as a solution in a problem of minimizing a cost function defined based on intensity/chromaticity differences of pixels from different images at the different sampled views. Additionally, optionally or alternatively, the depth or disparity data can be obtained using camera geometry information or camera settings (e.g., zoom factors, etc.). The depth or disparity data can be used by the layered image stack generator (110) to partition the multi-view input images (102) into the multi-view SDR and HDR layered image stacks (112, 114) and generate alpha maps (e.g., to be used in alpha compositing operations that convert layered images into unlayered images, etc.) included in the multi-view SDR and HDR layered image stacks (112, 114).

The user pose monitor (118) comprises software, hardware, a combination of software and hardware, etc., configured to receive a viewer's rendering environment user pose data 124 from a video client device operated by the viewer in real time or near real time. The viewer's rendering environment pose data (124) can be collected or generated in real time or near real time by the video client device using any combination of user pose tracking methods including but not limited to machine learning or ML based face detection, gaze tracking, viewport tracking, POV tracking, viewer position tracking, face tracking, and the like.

The viewer's rendering environment user pose data (124) may include real time or near real time representing some or all of: user pose images of the viewer captured by a camera, for example located in front of and facing the viewer: face meshes formed by a plurality of vertexes and placed over the viewer's face as depicted in detected face image portions in the captured images: coordinate and locational information of the plurality of vertexes in the face meshes placed over the viewer's face as depicted in detected face image portions in the captured images: positions and/orientations of specific features or locations—e.g., the viewer's pupil locations, the viewer's face orientation, the viewer's interpupil distance mid-point, etc.—in the viewer's face as depicted in detected face image portions in the captured images: etc.

The user pose monitor (118) can use the viewer's rendering environment user pose data (124) to monitor, establish, determine and/or generate the viewer's user poses—representing the viewer's (e.g., logical, virtual, represented, mapped, etc.) positions or orientations in image spaces or visual scenes depicted in the SDR and HDR layered image stacks (112, 114)—for the plurality of time points over the time interval/duration of an AR, VR or volumetric video application. In the video application, display images are to be derived by the video client device from the SDR and HDR layered image stacks (106) and rendered at the plurality of time points in the viewer's viewport as provided with an image display operating in conjunction with the video client device.

The pose selected layered image encoder (120) comprises software, hardware, a combination of software and hardware, etc., configured to receive a sequence of the viewer's (real time or near real time) user poses for the plurality of time points, use the sequence of user poses to dynamically or adaptively select a sequence of layered images in the sequence of SDR and HDR layered image stacks (106) for the plurality of time points, and encode the sequence of (pose selected) layered images—along with a sequence of alpha maps, a sequence of beta scale maps, etc., corresponding to the sequence of (pose selected) layered images—into a (e.g., 8-bit, backward compatible, multi-layered, etc.) video signal 122. The sequences of alpha maps, beta scale maps, etc., may be coded as attendant data, as image metadata, carried in a separate signal layer from a base layer used to encode the sequence of (pose selected) layered images in the video signal (122). In various operational scenarios, the sequence of (pose selected) layered images may comprise one of: SDR layered images only, HDR layered images only, a combination of SDR and HDR layered images, etc.

The sequence of pose selected layered images may cover or correspond to a sequence of sets of user pose selected sampled views (for or at the plurality of time points) close or adjacent to a sequence of target views as determined or represented by the sequence of viewer's user poses. A denser set of user pose selected sampled views may be used to capture relatively more view-dependent effects around a novel or synthesis view represented by a target view of the viewer/user. A less dense set of user pose selected sampled views may be used to capture relatively less view-dependent effects such as diffuse image details around the novel or synthesis view.

Each target view in the sequence of target views may be determined by the viewer's position and/or orientation (mapped, projected or represented) as indicated in the viewer's user pose, in the sequence of viewer's users poses, a respective time point in the plurality of time points. For example, the viewer's pose may be mapped or represented in an image space of a pair of SDR and HDR layered image stacks—among the sequence of the pairs of SDR and HDR layered image stacks—at the respective time point.

Each such target view may be used to identify or determine a respective set—for or at the respective time—of user pose selected sampled views in the sequence of sets of user pose selected sampled views. The respective set of user pose selected sampled views for the target view may include—e.g., a single closest, two closest, three closest, four closest, etc.—sampled views close or adjacent to that target view.

As used herein, video content in a video signal (or stream) as described herein may include, but are not necessarily limited to, any of: audiovisual programs, movies, video programs, TV broadcasts, computer games, augmented reality (AR) content, virtual reality (VR) content, automobile entertainment content, etc.

As used herein, a "video streaming server" may refer to one or more upstream devices that prepare and stream video content to one or more video streaming clients such as video decoders in order to render at least a portion of the video content on one or more displays. The displays on which the video content is rendered may be part of the one or more video streaming clients, or may be operating in conjunction with the one or more video streaming clients.

Example video streaming servers may include, but are not necessarily limited to, any of: cloud-based video streaming servers located remotely from video streaming client(s), local video streaming servers connected with video streaming client(s) over local wired or wireless networks, VR devices, AR devices, automobile entertainment devices, digital media devices, digital media receivers, set-top boxes, gaming machines (e.g., an Xbox), general purpose personal computers, tablets, dedicated digital media receivers such as the Apple TV or the Roku box, etc.

The video streaming server (100) may be used to support AR applications, VR applications, 360 degree video applications, volumetric video applications, real time video applications, near-real-time video applications, non-real-time omnidirectional video applications, automobile entertainment, helmet mounted display applications, heads up display applications, games. 2D display applications. 3D display applications, multi-view display applications, etc.

Figure 1C:
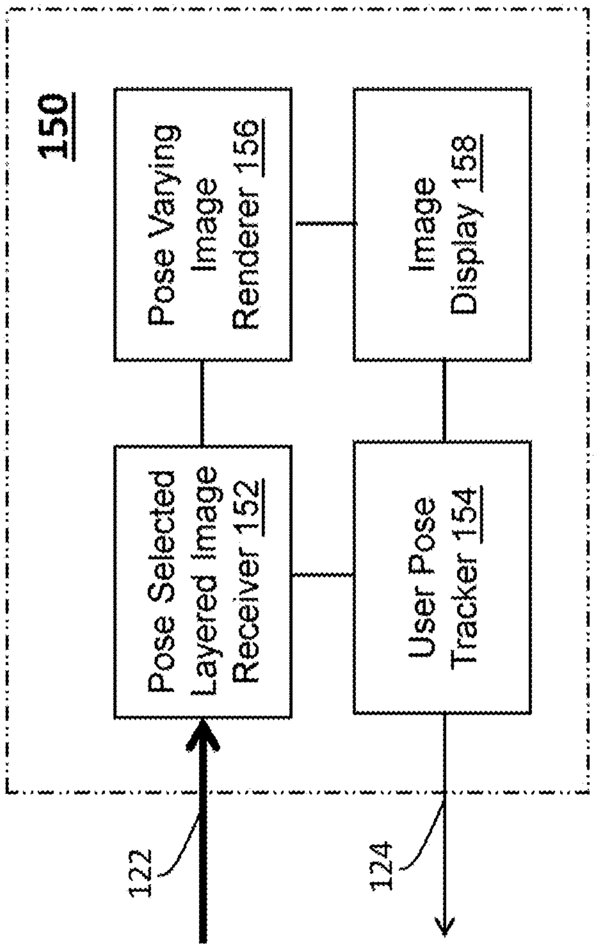
FIG. 1C illustrates an example downstream recipient device.

FIG. 1C illustrates an example downstream recipient device such as a video client device 150 that comprises a pose selected layered image receiver 152, a user pose tracker 154, a pose varying image renderer 156, image display 158, etc. Some or all of the components of the video client device (150) may be implemented by one or more devices, modules, units, etc., in software, hardware, a combination of software and hardware, etc.

Example video client devices as described herein may include, but are not necessarily limited to only, any of: big screen image displays, home entertainment systems, set-top boxes and/or audiovisual devices operating with image displays, mobile computing devices handheld by users/viewers (e.g., in spatially stable or varying relationships with eyes of the users/viewers, etc.), wearable devices that include or operate with image displays, computing devices including or operating with head mounted displays or heads-up displays, etc.

The user pose tracker (154) comprises software, hardware, a combination of software and hardware, etc., configured to operate with one or more user pose tracking sensors (e.g., cameras, depth-of-field sensors, motion sensors, position sensors, eye trackers, etc.) to collect real time or near real time user pose tracking data in connection with a viewer (or user) operating with the video client device (150).

In some operational scenarios, the user pose tracker (154) may implement image processing operations, computer vision operations and/or incorporate ML tools to generate the viewer's rendering environment user pose data 124 from the real time or near real time user pose tracking data collected by the user pose tracking sensors.

For example, the user pose tracker (154) may include, deploy and/or implement one or more CNNs used to detect the viewer's face in user pose tracking images acquired by a camera in a spatially fixed position to the image display (158), logically impose face meshes on the viewer's detected face in images, determine coordinates of vertexes of the face meshes, determine positions and/or orientations of the viewer's face or a mid-point along the interpupil line of the viewer, etc. Some or all outputs from the CNNs may be included in the viewer's rendering environment user pose data (124).

The user pose tracking data and/or the viewer's rendering environment user pose data (124) derived therefrom may include static and/or dynamic data in connection with the image display (158) and/or results of analyses performed based at least in part on the data in connection with the image display (158).

For example, spatial size(s)/dimension(s) of the image display (158) and the spatial relationships between the camera used to acquire the user pose tracking images and the image display (158) may be included as a part of the user pose tracking data and/or the viewer's rendering environment user pose data (124).

Additionally, optionally or alternatively, actual spatial size(s)/dimension(s) and spatial location(s) of a specific display screen portion in the image display (158) used to render the display images derived from the layered images received from the video streaming server (100) may be included as a part of the user pose tracking data and/or the viewer's rendering environment user pose data (124).

Additionally, optionally or alternatively, any zoom factors used to render the display images on the image display (158) or portion(s) thereof may be included as a part of the user pose tracking data and/or the viewer's rendering environment user pose data (124).

The static and/or dynamic data in connection with the image display (158) may be used—by the video streaming server (100) alone, the video streaming client device (150)) alone, or a combination of the server device (100) and the client device (150)—to determine the viewer's position and/or orientation in relation to image spaces or visual scenes depicted by the display images rendered on the image display (158).

The video client device (150) can send the viewer's rendering environment user pose data (124) to the video streaming server (100). The viewer's rendering environment user pose data (124) may be sampled, generated and/or measured at a relatively fine time scale (e.g., every millisecond, every five milliseconds, etc.). The viewer's rendering environment user pose data (124) can be used—by the video streaming server (100) alone, the video streaming client device (150) alone, or a combination of the server device (100) and the client device (150)—to establish/determine the viewer's positions and/or orientations relative to the image spaces or visual scenes depicted in the display images at a given time resolution (e.g., every millisecond, every five milliseconds, etc.).

The pose selected layered image receiver (152) comprises software, hardware, a combination of software and hardware, etc., configured to receive and decode the (e.g., real time, near real time, etc.) video signal (122) into a sequence of (pose selected) layered images for a sequence of (e.g., consecutive, sequential, etc.) time points in a time interval or duration of an AR, VR, or immersive video application. In addition, the pose selected layered image receiver (152) retrieves a sequence of alpha maps respectively for the plurality of time points corresponding to the sequence of (pose selected) layered images, a sequence of beta scale maps respectively for the plurality of time points corresponding to the sequence of (pose selected) layered images, etc., from the video signal (122).

Specific (pose selected) layered images in the sequence of (pose selected) layered images-along with specific alpha maps and specific beta scale maps corresponding to the specific (pose selected) layered images—for or at a specific time point in the sequence of time points may cover a specific set of user pose selected sampled views, which are selected by the video streaming server (100)—from a plurality of (e.g., neighboring, non-neighboring, corresponding to cameras located at vertexes of a grid of a planar surface, etc.) sampled views represented in a specific pair of SDR and HDR layered image stacks for or at the specific time point-based at least in part on a specific target view mapped, represented and/or indicated by a specific user pose data portion for or at the specific time point.

The pose varying image renderer (156) comprises software, hardware, a combination of software and hardware, etc., configured to receive the decoded sequence of (pose selected) layered images, perform client-side image processing operations to generate a sequence of (e.g., consecutive, sequential, etc.) display images from the decoded sequence of (pose selected) layered images, and render the sequence of display images on the image display (158) for or at the plurality of time points.

The client-side image processing operations performed by the video client device (150) or the pose varying image renderer (156) therein may include adjusting alpha values in alpha maps for sampled views to generate or adjusted alpha values constituting adjusted alpha maps for the viewer's real time or near real time viewpoints (as indicated by the viewer's real time or near real time positions and/or orientations).

By way of illustration but not limitation, a pixel in a first image layer of a sampled view represented in a received (pose selected) layered image may be of a first depth, which may be a relatively large depth relative to a virtual or real camera located at an origin or reference position of the sample view. In the sampled view, the pixel is disoccluded or visible.

However, at a shifted viewpoint from the sampled view such as the viewer's real time or near real time viewpoint, the pixel of the first image layer of the first depth may be occluded or invisible due to the presence of an image detail (or a group of pixels) of a second image layer (of the same received (pose selected) layered image) of a second depth narrower or smaller than the first depth. This shifted viewpoint may represent a novel or synthesis view not covered/represented in any sampled view represented in the received (pose selected) layered image or not even covered/represented in any sampled view represented in original or input images that were used to derive SDR and HDR layered image stacks from which the received (pose selected) layered image is selected.

In response to determining (e.g., through ray tracing from, or in reference to, the shifted viewpoint, through ray space interpolation, etc.) that the previously disoccluded or visible pixel for the sampled view is hindered or located behind an image detail (in another image layer of the received (pose selected) layered image) of the closer depth in or for the shifted viewpoint, the pose varying image renderer (156) adjusts alpha values in the corresponding alpha map for the (pose selected) layered image to generate adjusted alpha values for opacities, transparencies, weight factors, etc., in or for the shifted viewpoint, of associated pixels of these image layers in the received (pose selected) layered image.

The adjusted alpha values in the adjusted alpha map—e.g., the transparencies, opacities, etc.—may indicate newly occluded regions (or holes) for a composite image generated from the (pose selected) layered image in the shifted viewpoint. The composite image represents a warped image in or for the shifted viewpoint, as compared with an unlayered image represented by the (pose selected) layered image in or for the sampled view. Pixel values of the composite image can be generated or derived as (e.g., normalized, etc.) weighted or blended sums or averages of pixel values in different image layers of the (pose selected) layered image using alpha compositing operations (e.g., performed in an order from the image layer of the furthest depth to the image layer of the nearest depth, etc.) on the different image layers in the (pose selected) layered image in the shifted viewpoint based at least in part on the adjusted alpha values in the adjusted alpha map.

Image warping operation as represented by alpha map adjustment and alpha composting operations can be performed for each of some or all (pose selected) layered images for each of some or all of the other sampled views in the same set of user pose selected sampled views to which the sampled view is a part.

In some operational scenarios, the newly occluded regions of the composite image in the shifted viewpoint derived from the (pose selected) layered image for the sampled view may be filled, blended and/or complemented by other composite images in the shifted viewpoint derived from the (pose selected) layered images for the other sampled views in the same set of user pose selected sampled views (for a given time point in the plurality of time points) to which the sampled view is a part.

For the purpose of illustration only, the sequence of (pose selected) layered images for the sequence of time points as decoded from the video signal (122) may represent a sequence of (pose selected) SDR layered images for the sequence of time points.

In operational scenarios in which SDR display images are to be rendered on the image display (158), the video client device (150) or the pose varying image renderer (156) therein can render a sequence of (finally or blended or hole filled) composite images generated from the sequence of (pose selected) layered images as the sequence of display images on the image display (158).

In operational scenarios in which HDR display images are to be rendered on the image display (158), instead of performing alpha compositing operations based on target viewpoint adjusted alpha values in an adjusted alpha map directly on a received (pose selected) SDR layered image in the decoded sequence of (pose selected) SDR layered images for the sequence of time points, the video client device (150) or the pose varying image renderer (156) therein can first perform beta scaling operations on some or all (SDR) image layers in the received (pose selected) SDR layered image to generate some or all corresponding (HDR) image layers that have not been encoded in the video signal (122). Subsequently, the video client device (150) or the pose varying image renderer (156) therein can perform the alpha compositing operations based on the target viewpoint adjusted alpha values in the adjusted alpha map directly on the (HDR) image layers generated from the beta scaling operations to generate an HDR composite image. The video client device (150) or the pose varying image renderer (156) therein can directly render a sequence of (finally or blended or hole filled) HDR composite images-generated through the beta scaling and alpha compositing operations from the sequence of (pose selected) SDR layered images—as the sequence of display images on the image display (158). Additionally, optionally or alternatively, the video client device (150) or the pose varying image renderer (156) therein can perform additional image processing operations such as display management or DM operations (e.g., based on DM image metadata received with the video signal (122), etc.) on the sequence of HDR composite image to generate the sequence of display images for rendering on the image display (158).

It should be noted that, in some operational scenarios, a video signal as described herein may be encoded with pose selected HDR layered images (instead of SDR layered images), alpha maps and beta scale maps corresponding to the pose selected HDR layered images, etc. Like operations that have been described as performing with received pose selected SDR layered images can be performed by a video client device to generate display images to be rendered on an image display operating with the video client device.

4. User Pose Selected Sampled Views

Figure 2A:
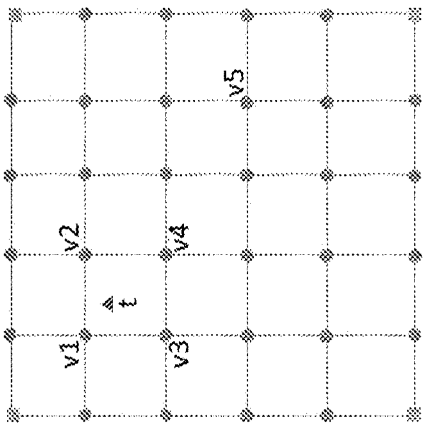
FIG. 2A illustrates example sets of user pose selected sampled views.

FIG. 2A illustrates example sets of user pose selected sampled views selected, based in part or in whole on a target view denoted "t", from a plurality of sampled views represented or covered by a (e.g., SDR, HDR, etc.) layered image stack as described herein for or at a given time point in a plurality of time points. The target view may be a novel view not represented or covered by any sampled view in the plurality of sampled views and represents a shifted viewpoint from these sampled views.

A light field of a 3D image space or visual scene depicted in the layered image stack for or at the given time point is captured and/or discretized based on a plurality of layered images in the layered image stack that respectively cover the plurality of sampled views.

Without loss of generality, as illustrated in FIG. 2A, the plurality of sampled views in the layered image stack may be represented as a discrete distribution of points (or vertexes) in a uniform grid. Each point in the discrete distribution represents a corresponding sampled view and comprises a combination of a corresponding view position and a corresponding view direction. View positions covered by the plurality of sampled views may be distributed over a 2D viewing area, a 3D viewing volume, etc., up to an entire venue in a multiview video experience (e.g., for VR experience, for AR experience, etc.). View directions covered by the plurality of sampled views may cover one or more solid angles up to a full sphere.

It should be noted that, in various embodiments, the plurality of sampled views in the layered image stack may or may not be represented with a uniform grid as illustrated in FIG. 2A. For example, the plurality of sampled views may, but is not necessarily limited to only, be represented by a discrete distribution of points in a non-uniform grid such as a spherical discrete distribution. Additionally, optionally or alternatively, view positions covered by the plurality of sampled views may or may not be spatially uniformly distributed in a spatial viewing surface or volume. For example, denser view positions may be distributed at one or more (e.g., central, paracentral, etc.) spatial regions than other (e.g., peripheral, non-central) spatial regions in the spatial viewing surface or volume. Additionally, optionally or alternatively, view directions covered by the plurality of sampled views may or may not be spatially uniformly distributed in solid angle(s). For example, denser view directions may be distributed at one or more (central, paracentral, etc.) subdivisions of the solid angle(s) than at other (e.g., peripheral, non-central) subdivisions of the solid angle(s).

The target view "t" at the given time may be determined as a combination of a specific spatial position (or a view position) and a specific spatial direction (or a view direction) of a detected face of the viewer/user at the given time.

The target view "t", or the view position and/or the view direction therein, can be used to select or identify a set of user pose selected sampled views from among the plurality of sampled views in the layered image stack. The user pose selected sampled views in the set of user pose selected sampled views may be selected based on one or more selection factors such as one or more of: proximity of view positions of the user pose selected sampled views relative to the view position of the target view, proximity of view directions of the user pose selected sampled views relative to the view direction of the target view, weighted or unweighted combinations of the foregoing, etc.

In an example, the user pose selected sampled views may represent the closest sampled views-such as those denoted as "v1, "v2, "v3", "v4", etc.—as compared with or relative to the target view "t". In another example, the user pose selected sampled views may represent the closest sampled views (e.g., "v1, "v2, "v3", "v4", etc.) plus one or more non-closest sampled views such as denoted as "v5" as compared with or relative to the target view "t". The one or more non-closest sampled views may be one located at a center of symmetry of the plurality of sampled views, those located at the furthest from the center of symmetry, etc. These non-closest sampled view may be used to fill holes or provide newly disoccluded (e.g., diffusive, etc.) image details that may be missing or incomplete in the closest sampled views.

An upstream device (e.g., 100 of FIG. 1B, etc.) can retrieve/access image data and image metadata for the set of user pose selected sampled views. The image data and image metadata may include, but are not necessarily limited to only, pose selected (or target view selected) layered images, alpha maps for these layered image, beta scale maps for these layered images, etc., corresponding to the set of user pose selected sampled views selected based on the target view "t". A video signal (e.g., 122 of FIG. 1B and FIG. 1C, etc.) may be encoded with the image data and image metadata as pose selected image data or metadata for the given time point in the plurality of time points and transmitted/or delivered by the upstream device to a downstream recipient device (e.g., 150 of FIG. 1C, etc.).

In response to receiving or decoding, from the video signal, the pose selected image data or metadata for the given time point, the downstream recipient device can use the pose selected image data or metadata to perform image warping operations (e.g., alpha value adjustment of a sampled view to generate an adjusted map for the current viewpoint of the viewer, alpha compositing operations based at least in part on the adjusted alpha values in the adjusted alpha map to generate an unlayered image for the current viewpoint, image blending from unlayered images generated for more than one sampled view, etc.) and/or beta scaling operations (e.g., enhancing or increasing dynamic or brightness range from SDR to HDR, etc.) to generate or derive a corresponding display image for rendering on an image display (e.g., 158 of FIG. 1C, etc.) operating in conjunction with the downstream recipient device.

In some operational scenarios, the spatial position of the viewer/user as represented in the image space or visual scene depicted in the layered image stack—or the view position of the target view "t"—may not be located or co-located within a surface (e.g., the 2D plane in which the grid is located, etc.) formed by view positions of (e.g., three or more, etc.) sampled views in the plurality of sampled views.

For example, the viewer/user may make head motion to move to spatially closer to or away from a stationary (to the Earth coordinate system) image display (e.g., 158 of FIG. 1C, etc.). Similarly, the viewer/user may make hand motion to move a mobile phone including the image display (158) closer to or away from eyes of the viewer/user. Hence, the view position of the target view of the viewer/user may or may not be located or co-located within the same surface formed by view positions of the sampled views in the plurality of sampled views.

The downstream recipient device (or the upstream device) may scale image data (e.g., layered image or different image pieces at different depth or depth sub-ranges, etc.) and/or image metadata (e.g., alpha map, beta scale map, etc.) for a sampled view according to spatial differences between the target view and the sampled view. For example, when the viewer/user is mapped to the target view that is closer to the image display than the sampled view; zooming-in or magnification operations may be performed on the image data and/or image metadata in view of or based at least in part on the closer view position. Conversely, when the viewer/user is mapped to the target view that is further away from the image display than the sampled view, zooming-out or demagnification operations may be performed on the image data and/or image metadata in view of or based at least in part on the further view position.

Figure 2B:
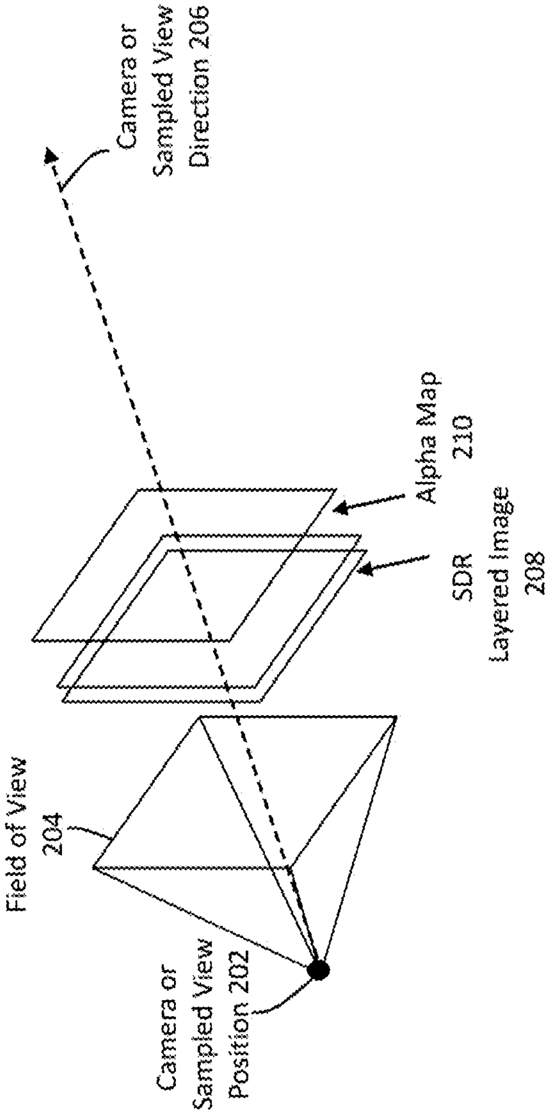
FIG. 2B illustrates example SDR image data and metadata in a layered image stack.

FIG. 2B illustrates an example set of SDR image data and metadata, in a layered image stack, for a sample view in a plurality of sampled views represented or covered by the layered image stack. The layered image stack comprises a plurality of sets of SDR image data and metadata for the plurality of sampled views. Each set of SDR image data and metadata in the plurality of sets of SDR image data and metadata in the plurality of sets of SDR image data and metadata corresponds to, or is for, a respective sampled view in the plurality of sampled views.

Each sampled view in the plurality of sampled view may be specified or defined with a view position and a view direction. As shown in FIG. 2B, the sampled view may be specified by a camera or sampled view position 202 and a camera or sampled view direction 206. SDR image data the set of SDR image data and metadata may, but is not necessarily limited to only, include an SDR layered image 208. SDR image metadata in the set of SDR image data and metadata may, but is not necessarily limited to only, include an alpha map 210. The SDR layered image (208) can be alpha composited (e.g., using an image composition operation such as an "over" operator, in a compositional order from the furthest image layer to the nearest image layer, etc.) into an SDR unlayered (e.g., single layer, etc.) image. The SDR unlayered image or the SDR layered image covers a field of view 204 as viewed by a camera or by reference viewer/user located at the camera or sampled view position (202) along the camera or sampled view direction (206).

Figure 2C:
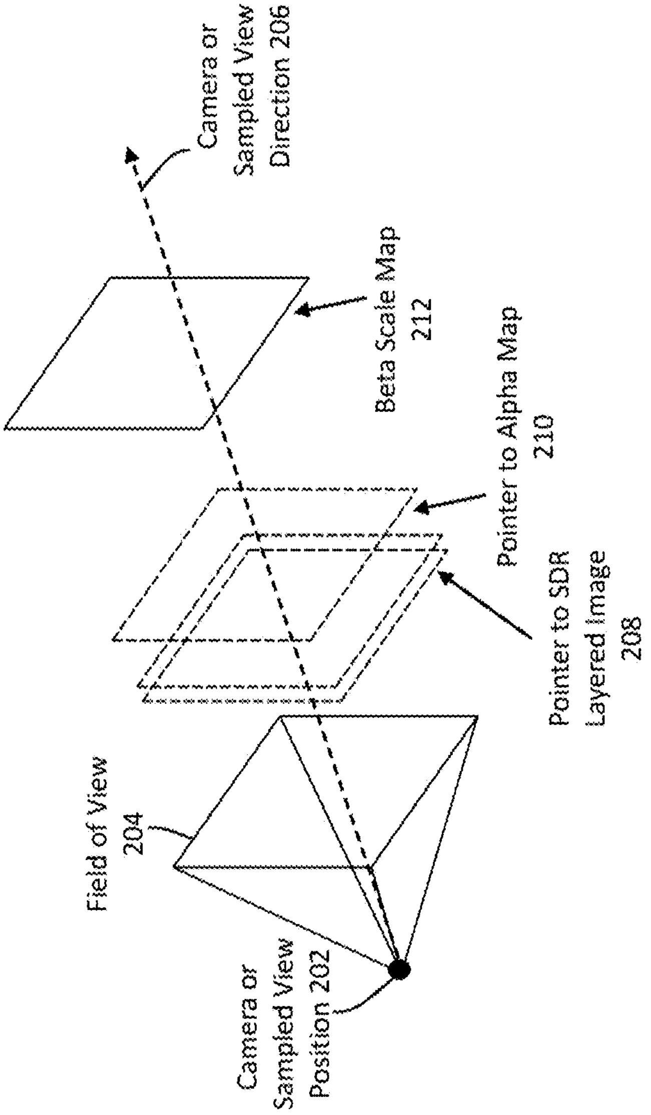
FIG. 2C illustrates example HDR image data and metadata in a layered image stack.

FIG. 2C illustrates an example set of HDR image data and metadata, in a layered image stack, for a sample view in a plurality of sampled views represented or covered by the layered image stack. The layered image stack comprises a plurality of sets of HDR image data and metadata for the plurality of sampled views. Each set of HDR image data and metadata in the plurality of sets of HDR image data and metadata in the plurality of sets of HDR image data and metadata corresponds to, or is for, a respective sampled view in the plurality of sampled views.

As noted, each sampled view in the plurality of sampled view may be specified or defined with a view position and a view direction such as the camera or sampled view position (202) and the camera or sampled view direction (206), as illustrated in FIG. 2B and FIG. 2C.

In some operational scenarios, the set of HDR image data and metadata may be devoid of actual HDR pixel or codeword values or HDR image layers. Instead, HDR image metadata in the set of HDR image data and metadata may include a first reference or pointer to the SDR layered image (208) for the same sampled view and a second reference or pointer to the alpha map (210) corresponding to the SDR layered image (208) for the same sampled view: In addition, the HDR image metadata in the set of HDR image data and metadata may include, but is not necessarily limited to only, a beta scale map 212 for the same sampled view: The beta scale map 212 may be used to perform scaling operations on the SDR layered image (208) to generate an HDR layered image of a different (e.g., relatively high, etc.) dynamic range from that of the SDR layered image (208). The HDR layered image can be further alpha composited (e.g., using an image composition operation such as an "over" operator, in a compositional order from the furthest image layer to the nearest image layer, etc.) into an HDR unlayered (e.g., single layer, etc.) image.

The HDR unlayered image or the HDR layered image covers the same field of view (204) as covered by the corresponding SDR unlayered image or the corresponding SDR layered image, as viewed by a camera or by reference viewer/user located at the camera or sampled view position (202) along the camera or sampled view direction (206).

Figure 3A:
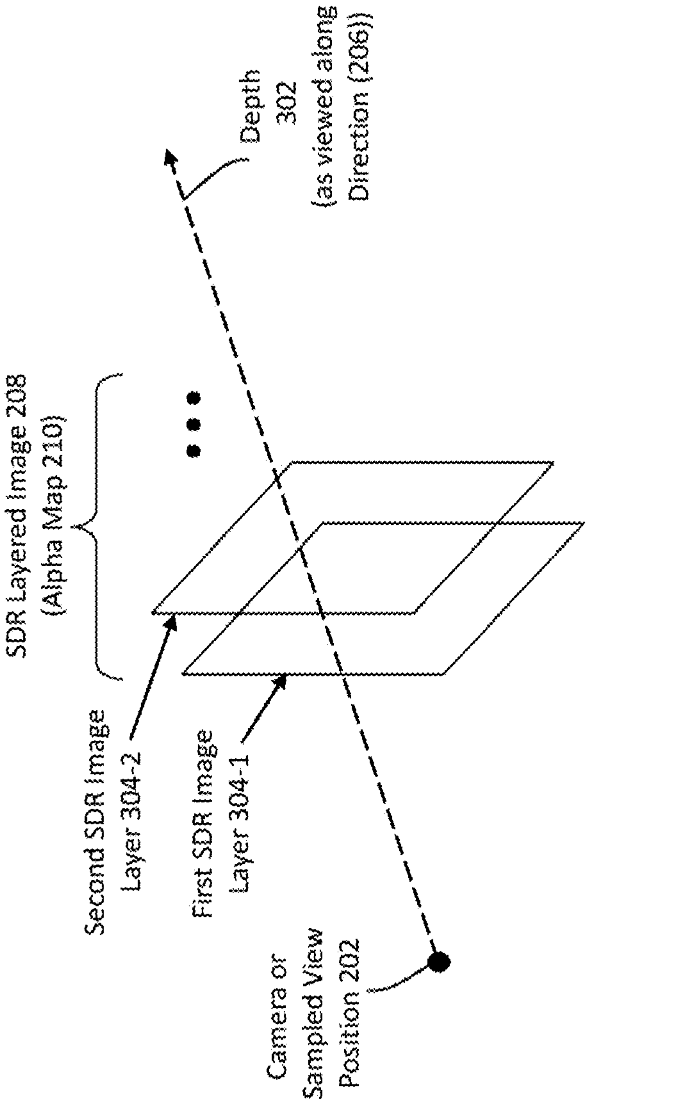
FIG. 3A and FIG. 3B illustrate example image layers in layered images.

FIG. 3A illustrates example SDR image layers in the SDR layered image (208) with different depths or depth sub-ranges along a dimension of depth 302 as viewed from the camera or sampled view position (202) along the camera or sampled view direction (206). As illustrated, the SDR layered image (208) comprises a plurality of SDR image layers including but not necessarily limited to only: a first SDR image layer 304-1 at a first depth value or depth sub-range along the dimension of depth (302), a second SDR image layer 304-2 at a second depth value or depth sub-range along the dimension of depth (302), and so on. The second depth value or depth sub-range may be different from the first depth value or depth sub-range.

Alpha values in the alpha map (210) for the SDR layered image (208) of the sampled view may be used to construct an SDR unlayered (or single layer) image from the SDR layered image (208). While image details depicted in pixels in these image layers are visible or disoccluded in the sampled view represented by the camera or sampled view position (202) and the camera or sampled view direction (206), some of these image details may be occluded in part or in whole from a different viewpoint such as a target view represented by a view position and direction of the viewer/user. Accordingly, the alpha values in the alpha map (210) for the SDR layered image (208) of the sampled view may be adjusted (e.g., using ray tracing, ray space interpolation, etc.) to reflect new opacities or transparencies of any, some or all of the pixels in the target view: The adjusted values in the adjusted alpha map may be used to construct an SDR unlayered (or single layer) image from the SDR layered image (208), albeit there may be holes or newly occluded image details-which may be filled or blended by constructed SDR unlayered (or single layer) images for other sampled views.

Figure 3B:
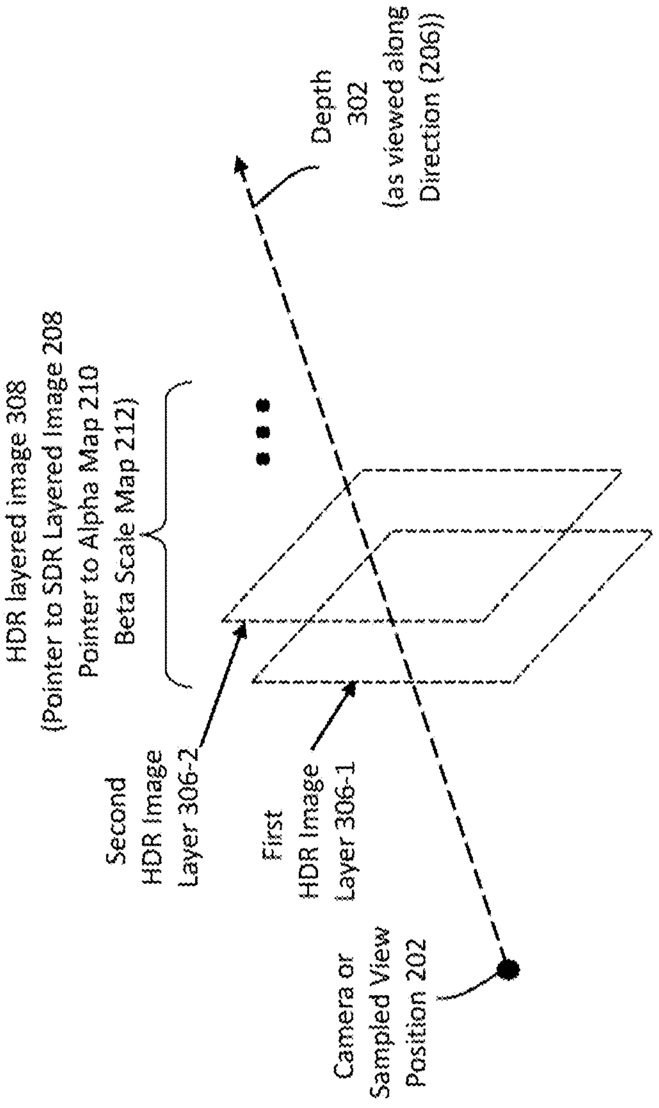

FIG. 3B illustrates example HDR image layers in an HDR layered image (e.g., 308, etc.). The HDR image layers may be constructed by applying beta scaling operations on the corresponding SDR image layers as pointed to by the image metadata for the sampled view and may be of the same different depths or depth sub-ranges along the dimension of depth (302) as the corresponding SDR image layers, as viewed from the camera or sampled view position (202) along the camera or sampled view direction (206). As illustrated, the HDR layered image (308) comprises a plurality of (constructed) HDR image layers including but not necessarily limited to only: a first HDR image layer 306-1 at the first depth value or depth sub-range along the dimension of depth (302), a second HDR image layer 306-2 at the second depth value or depth sub-range along the dimension of depth (302), and so on. The first HDR image layer (306-1) at the first depth value or depth sub-range may be constructed by applying scaling operations based on first beta scaling data in a beta scale map 212 for the sampled view. The second HDR image layer (306-2) at the second depth value or depth sub-range may be constructed by applying scaling operations based on second beta scaling data in the beta scale map (212) for the sampled view.

The same alpha values in the alpha map (210), as pointed by the image metadata for the sampled view, for the SDR layered image (208) of the sampled view may be used to construct an HDR unlayered (or single layer) image for the sampled view from the HDR layered image (308). In addition, the same adjusted alpha values in the adjusted alpha map for the target view may be used to construct an HDR unlayered (or single layer) image for the target view from the HDR layered image (308)—which may be filled or blended by constructed HDR unlayered (or single layer) images for other sampled views.

5. Example Process Flows

Figure 4A:
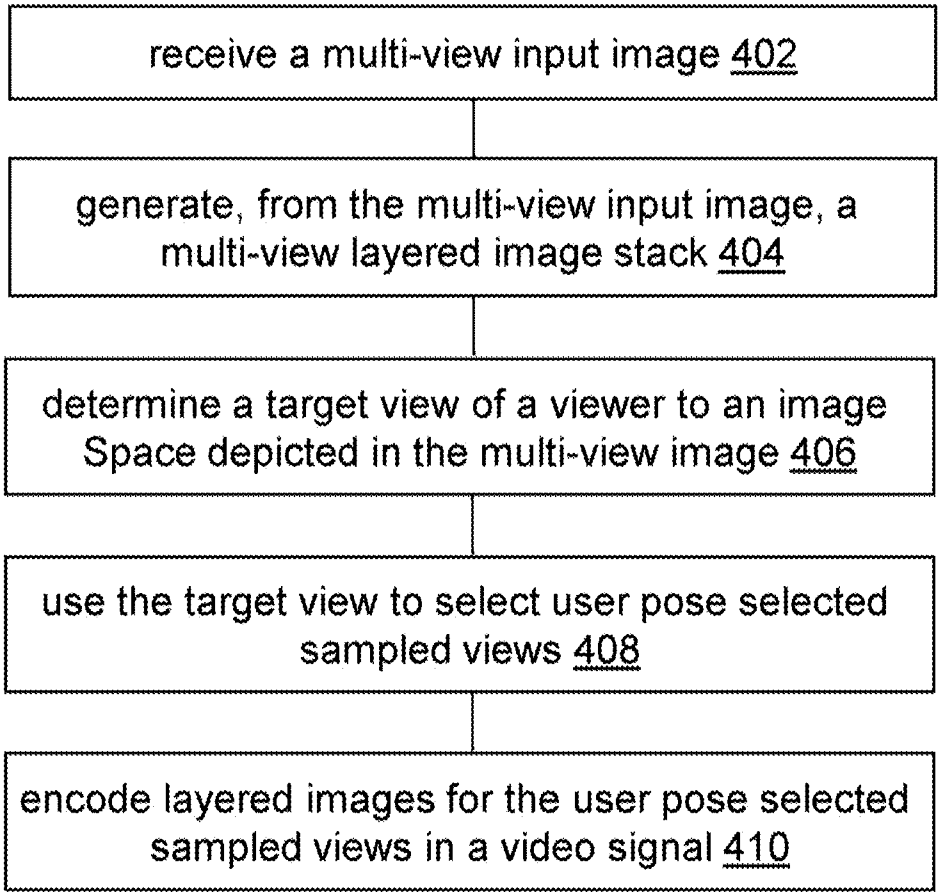
FIG. 4A and FIG. 4B illustrate example process flows.

FIG. 4A illustrates an example process flow according to an example embodiment of the present invention. In some example embodiments, one or more computing devices or components may perform this process flow. In block 402, an image processing device (e.g., an upstream device, an encoder device, a transcoder, a media streaming server, etc.) receives a multi-view input image, the multi-view input image covering a plurality of sampled views to an image space depicted in the multi-view input image.

In block 404, the image processing device generates, from the multi-view input image, a multi-view layered image stack of a plurality of layered images of a first dynamic range for the plurality of sampled views, a plurality of alpha maps for the plurality of layered images, and a plurality of beta scale maps for the plurality of layered images.

In block 406, the image processing device determines a target view of a viewer to the image space, the target view being determined based at least in part on a user pose data portion generated from a user pose tracking data collected while the viewer is viewing rendered images on an image display.

In block 408, the image processing device uses the target view of the viewer to select a set of user pose selected sampled views from among the plurality of sampled views represented in the multi-view input image.

In block 410, the image processing device encodes a set of layered images for the set of user pose selected sampled views in the plurality of layered images of the multi-view layered image stack, along with a set of alpha maps for the set of user pose selected sampled views in the plurality of alpha maps of the multi-view layered image stack and a set of beta scale maps for the set of user pose selected sampled views in the plurality of beta scale maps of the multi-view layered image stack, into a video signal to cause a recipient device of the video signal to generate a display image from the set of layered images for rendering on the image display.

In an embodiment, the set of beta scale map can be used to apply scaling operations on the set of layered images to generate a set of scaled layered images of a second dynamic range for the set of user pose selected sampled views: the second dynamic range is different from the first dynamic range.

In an embodiment, the display image represents one of: a standard dynamic range image, a high dynamic range image, a display mapped image that is optimized for rendering on a target image display, etc.

In an embodiment, the multi-view input image includes a plurality of single-view input images for the plurality of sampled views: the plurality of single-view images of the first dynamic range is generated from the plurality of single-view input images used to generate the plurality of layered images: each single-view image of the first dynamic range in the plurality of single-view images of the first dynamic range corresponds to a respective sampled view in the plurality of sampled views and is partitioned into a respective layered image for the respective sampled view in the plurality of layered images.

In an embodiment, the plurality of single-view input images for the plurality of sampled views is used to generate a second plurality of single-view images of a different dynamic range for the plurality of sampled views: the second plurality of single-view images of the different dynamic range includes a second single-view image of the different dynamic range for the respective sampled view: the plurality of beta scale maps includes a respective beta scale map for the respective sampled view: the respective beta scale map includes beta scale data to be used to perform beta scaling operations on the single-view image of the first dynamic range to generate a beta scaled image of the different dynamic range that approximates the second single-view image of the different dynamic range.

In an embodiment, the beta scaling operations include one of: simple scaling with scaling factors, or applying one or more codeword mapping relationships to map codewords of the single-view image of the first dynamic range to generate corresponding codeword of the beta scaled image of the different dynamic range.

In an embodiment, the beta scaling operations are performed in place of one or more of: global tone mapping, local tone mapping, display mapping operations, color space conversion, linear mapping, non-linear mapping, etc.

In an embodiment, the set of layered images for the set of user pose selected sampled views is encoded in a base layer of the video signal.

In an embodiment, the set of alpha maps and the set of beta scale maps for the set of user pose selected sampled views are carried in the video signal as image metadata in a data container separate from the set of layered images.

In an embodiment, the plurality of layered images includes a layered image for a sampled view in the plurality of sampled views: the layered image includes different image layers respectively at different depth sub-ranges from a view position of the sampled view.

Figure 4B:
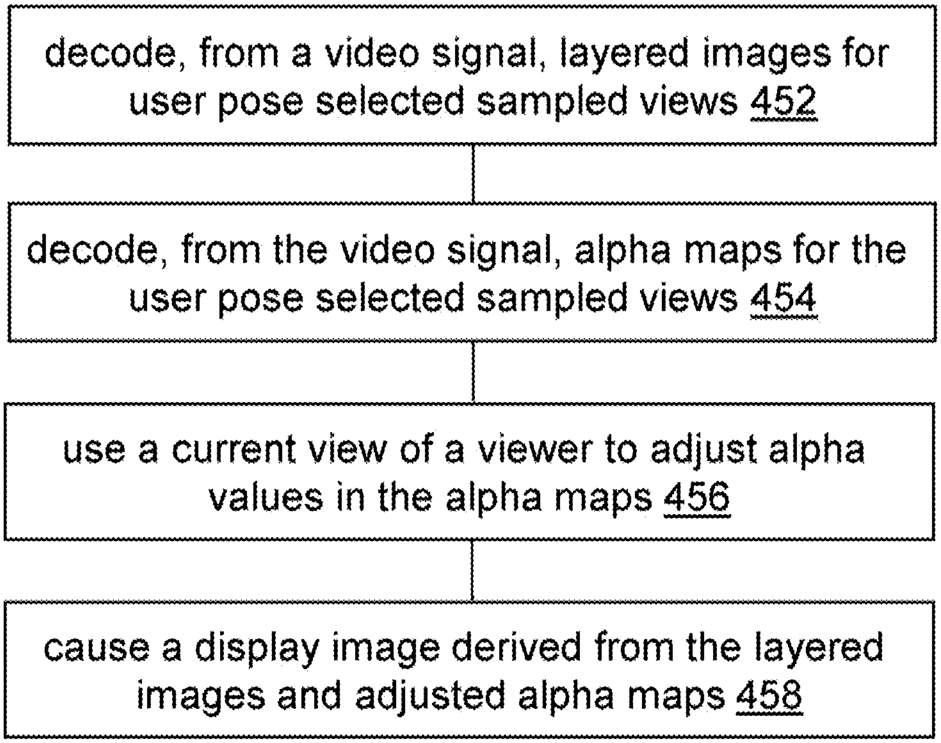

FIG. 4B illustrates an example process flow according to an example embodiment of the present invention. In some example embodiments, one or more computing devices or components may perform this process flow. In block 452, a recipient device decodes, from a video signal, a set of layered images of a first dynamic range for a set of user pose selected sampled views, the set of user pose selected sampled views having been selected based on user pose data from a plurality of sampled views covered by a multi-view source image, the multi-view source image having been used to generate a corresponding multi-view layered image stack: the corresponding multi-view layered image having been used to generate the set of layered images.

In block 454, the recipient device decodes, from the video signal, a set of alpha maps for the set of user pose selected sampled views.

In block 456, the recipient device uses a current view of a viewer to adjust alpha values in the set of alpha maps for the set of user pose selected sampled views to generate adjusted alpha values in a set of adjusted alpha maps for the current view.

In block 458, the recipient device causes a display image derived from the set of layered images and the set of adjusted alpha maps to be rendered on a target image display.

In an embodiment, a set of beta scale maps for the set of user pose selected sampled views is decoded from the video signal: the display image is of a second dynamic range different from the first dynamic range: the display image is generated from the set of beta scale map, the set of layered images and the set of adjusted alpha maps.

In an embodiment, the set of user pose selected sampled views includes two or more sampled views: the display image is generated by performing image blending operations on two or more intermediate images generated for the current view from the set of layered images and the set of adjusted alpha maps.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

6 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic. ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
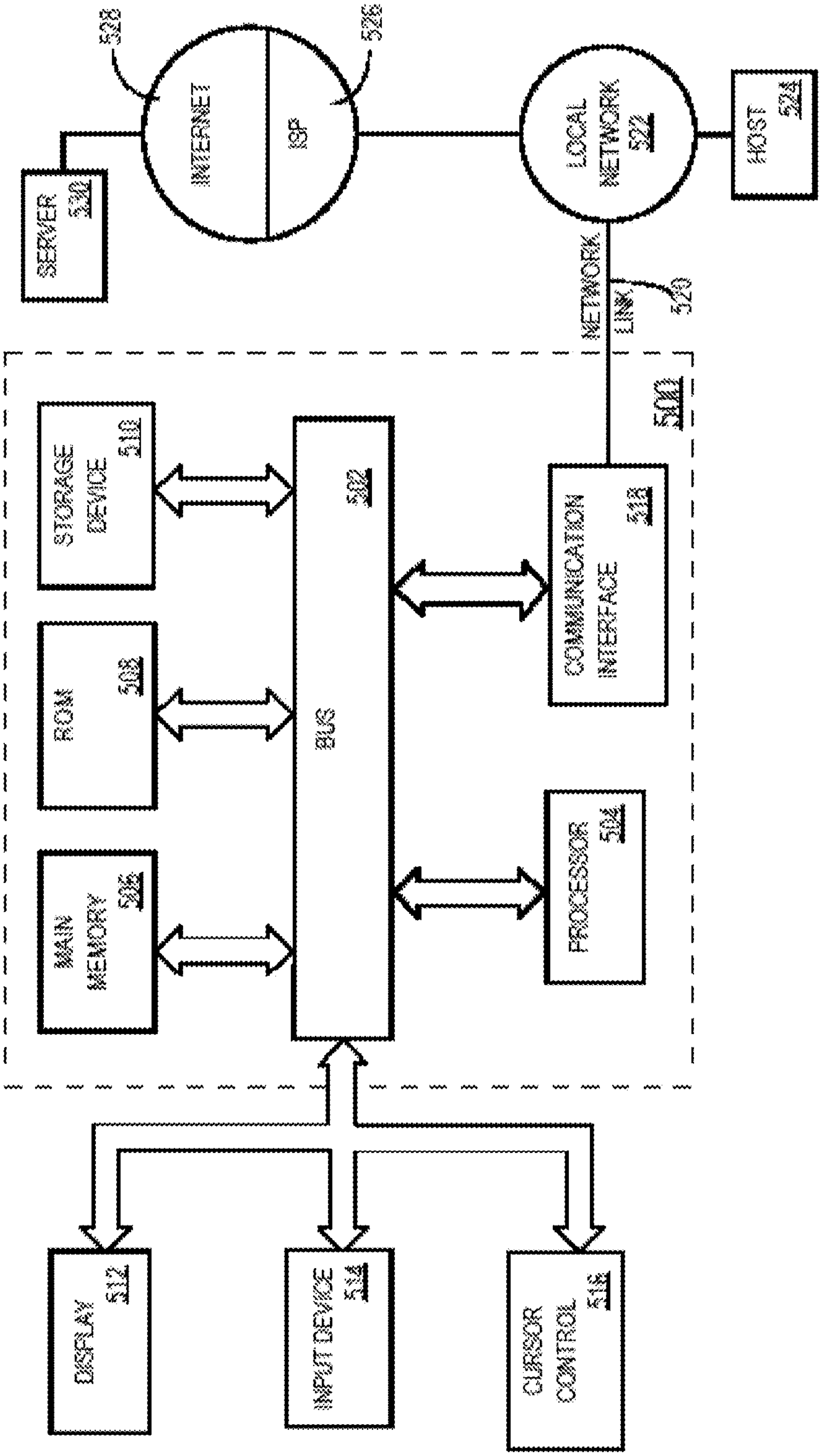
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method comprising:

receiving a multi-view input image, the multi-view input image covering a plurality of sampled views to an image space depicted in the multi-view input image;

generating, from the multi-view input image, a multi-view layered image stack of a plurality of layered images of a first dynamic range for the plurality of sampled views, a plurality of alpha maps for the plurality of layered images, and a plurality of beta scale maps for the plurality of layered images:

determining a target view of a viewer to the image space, the target view being determined based at least in part on a user pose data portion generated from a user pose tracking data collected while the viewer is viewing rendered images on an image display;

using the target view of the viewer to select a set of user pose selected sampled views from among the plurality of sampled views represented in the multi-view input image;

encoding a set of layered images for the set of user pose selected sampled views in the plurality of layered images of the multi-view layered image stack, along with a set of alpha maps for the set of user pose selected sampled views in the plurality of alpha maps of the multi-view layered image stack and a set of beta scale maps for the set of user pose selected sampled views in the plurality of beta scale maps of the multi-view layered image stack, into a video signal to cause a recipient device of the video signal to generate a display image from the set of layered images for rendering on the image display.

EEE 2. The method of EEE 1, wherein the set of beta scale map can be used to apply scaling operations on the set of layered images to generate a set of scaled layered images of a second dynamic range for the set of user pose selected sampled views; wherein the second dynamic range is different from the first dynamic range.

EEE 3. The method of EEE 1 or EEE 2, wherein the display image represents one of: a standard dynamic range image, a high dynamic range image, or a display mapped image that is optimized for rendering on a target image display.

EEE 4. The method of any of EEEs 1-3, wherein the multi-view input image includes a plurality of single-view input images for the plurality of sampled views; wherein the plurality of single-view images of the first dynamic range is generated from the plurality of single-view input images used to generate the plurality of layered images; wherein each single-view image of the first dynamic range in the plurality of single-view images of the first dynamic range corresponds to a respective sampled view in the plurality of sampled views and is partitioned into a respective layered image for the respective sampled view in the plurality of layered images.

EEE 5. The method of EEE 4, wherein the plurality of single-view input images for the plurality of sampled views is used to generate a second plurality of single-view images of a different dynamic range for the plurality of sampled views; wherein the second plurality of single-view images of the different dynamic range includes a second single-view image of the different dynamic range for the respective sampled view; wherein the plurality of beta scale maps includes a respective beta scale map for the respective sampled view; wherein the respective beta scale map includes beta scale data to be used to perform beta scaling operations on the single-view image of the first dynamic range to generate a beta scaled image of the different dynamic range that approximates the second single-view image of the different dynamic range.

EEE 6. The method of EEE 5, wherein the beta scaling operations include one of: simple scaling with scaling factors, or applying one or more codeword mapping relationships to map codewords of the single-view image of the first dynamic range to generate corresponding codeword of the beta scaled image of the different dynamic range.

EEE 7. The method of EEE 5 or 6, wherein the beta scaling operations are performed in place of one or more of: global tone mapping, local tone mapping, display mapping operations, color space conversion, linear mapping, or non-linear mapping.

EEE 8. The method of any of EEEs 1-7, wherein the set of layered images for the set of user pose selected sampled views is encoded in a base layer of the video signal.

EEE 9. The method of any of EEEs 1-8, wherein the set of alpha maps and the set of beta scale maps for the set of user pose selected sampled views are carried in the video signal as image metadata in a data container separate from the set of layered images.

EEE 10. The method of any of EEEs 1-9, wherein the plurality of layered images includes a layered image for a sampled view in the plurality of sampled views; wherein the layered image includes different image layers respectively at different depth sub-ranges from a view position of the sampled view.

EEE 11. A method comprising:

decoding, from a video signal, a set of layered images of a first dynamic range for a set of user pose selected sampled views, the set of user pose selected sampled views having been selected based on user pose data from a plurality of sampled views covered by a multi-view source image, the multi-view source image having been used to generate a corresponding multi-view layered image stack: the corresponding multi-view layered image having been used to generate the set of layered images;

decoding, from the video signal, a set of alpha maps for the set of user pose selected sampled views;

using a current view of a viewer to adjust alpha values in the set of alpha maps for the set of user pose selected sampled views to generate adjusted alpha values in a set of adjusted alpha maps for the current view;

causing a display image derived from the set of layered images and the set of adjusted alpha maps to be rendered on a target image display.

EEE 12. The method of EEE 11, where a set of beta scale maps for the set of user pose selected sampled views is decoded from the video signal; wherein the display image is of a second dynamic range different from the first dynamic range; wherein the display image is generated from the set of beta scale map, the set of layered images and the set of adjusted alpha maps.

EEE 13. The method of EEE 11 or 12, wherein the set of user pose selected sampled views includes two or more sampled views; wherein the display image is generated by performing image blending operations on two or more intermediate images generated for the current view from the set of layered images and the set of adjusted alpha maps.

EEE 14. An apparatus performing any of the methods as recited in EEEs 1-13.

EEE 15. A non-transitory computer readable storage medium, storing software instructions, which when executed by one or more processors cause performance of the method recited in any of EEEs 1-13.

The invention claimed is:

1. A method comprising:

receiving a multi-view input image, the multi-view input image covering a plurality of sampled views to an image space depicted in the multi-view input image;

generating, from the multi-view input image, a first multi-view layered image stack of a first dynamic range and a second multi-view layered image stack of a second dynamic range different from the first dynamic range;

wherein generating the first multi-view layered image stack of the first dynamic range and the second multi-view layered image stack of the second dynamic range includes:

generating a plurality of layered images of the first dynamic range for the plurality of sampled views, to be included in the first multi-view layered image stack, and generating a plurality of alpha maps for the plurality of layered images and a plurality of beta scale maps for the plurality of layered images, to be included in the second multi-view layered image stack of the second dynamic range;

wherein the second multi-view layered image stack further includes at least one of the plurality of layered images of the first dynamic range included in the first multi-view layered image stack, or references to the plurality of layered images of the first dynamic range included in the first multi-view layered image stack;

wherein the second multi-view layered image stack is devoid of pixel codeword values of the second dynamic range;

determining a target view of a viewer to the image space, the target view being determined based at least in part on a user pose data portion generated from a user pose tracking data collected while the viewer is viewing rendered images on an image display;

using the target view of the viewer to select a set of user pose selected sampled views from among the plurality of sampled views represented in the multi-view input image;

encoding a set of layered images for the set of user pose selected sampled views in the plurality of layered images of the first dynamic range included in the first multi-view layered image stack, along with a set of alpha maps for the set of user pose selected sampled views in the plurality of alpha maps of the multi-view layered image stack and a set of beta scale maps for the set of user pose selected sampled views in the plurality of beta scale maps of the second multi-view layered image stack, into a video signal to cause a recipient device of the video signal to generate a display image from the set of layered images for rendering on the image display.

2. The method of claim 1, wherein the set of beta scale map is used to apply scaling operations on the set of layered images to generate a set of scaled layered images of the second dynamic range for the set of user pose selected sampled views.

3. The method of claim 1, wherein the display image represents one of: a standard dynamic range image, a high dynamic range image, or a display mapped image that is optimized for rendering on a target image display.

4. The method of claim 1, wherein the multi-view input image includes a plurality of single-view input images for the plurality of sampled views; wherein the plurality of single-view images of the first dynamic range is generated from the plurality of single-view input images used to generate the plurality of layered images; wherein each single-view image of the first dynamic range in the plurality of single-view images of the first dynamic range corresponds to a respective sampled view in the plurality of sampled views and is partitioned into a respective layered image for the respective sampled view in the plurality of layered images.

5. The method of claim 4, wherein the plurality of single-view input images for the plurality of sampled views is used to generate a second plurality of single-view images of a different dynamic range for the plurality of sampled views; wherein the second plurality of single-view images of the different dynamic range includes a second single-view image of the different dynamic range for the respective sampled view; wherein the plurality of beta scale maps includes a respective beta scale map for the respective sampled view; wherein the respective beta scale map includes beta scale data to be used to perform beta scaling operations on the single-view image of the first dynamic range to generate a beta scaled image of the different dynamic range that approximates the second single-view image of the different dynamic range.

6. The method of claim 5, wherein the beta scaling operations include one of: simple scaling with scaling factors, or applying one or more codeword mapping relationships to map codewords of the single-view image of the first dynamic range to generate corresponding codeword of the beta scaled image of the different dynamic range.

7. The method of claim 5, wherein the beta scaling operations are performed in place of one or more of: global tone mapping, local tone mapping, display mapping operations, color space conversion, linear mapping, or non-linear mapping.

8. The method of claim 1, wherein the set of layered images for the set of user pose selected sampled views is encoded in a base layer of the video signal.

9. The method of claim 1, wherein the set of alpha maps and the set of beta scale maps for the set of user pose selected sampled views are carried in the video signal as image metadata in a data container separate from the set of layered images.

10. The method of claim 1, wherein the plurality of layered images includes a layered image for a sampled view in the plurality of sampled views; wherein the layered image includes different image layers respectively at different depth sub-ranges from a view position of the sampled view.

11. A method comprising:

decoding, from a video signal, a set of layered images for a set of user pose selected sampled views in a plurality of layered images of a first dynamic range included in a first multi-view layered image stack, along with a set of alpha maps for the set of user pose selected sampled views in a plurality of alpha maps of the multi-view layered image stack and a set of beta scale maps for the set of user pose selected sampled views in a plurality of beta scale maps of a second multi-view layered image stack;

wherein a target view of a viewer to an image space has been used to select the set of user pose selected sampled views from among the plurality of sampled views represented in a multi-view source image;

wherein the target view of the viewer to the image space has been determined based at least in part on a user pose data portion generated from a user pose tracking data collected while the viewer is viewing rendered images on an image display;

wherein the second multi-view layered image stack is devoid of pixel codeword values of a second dynamic range different from the first dynamic range;

wherein the second multi-view layered image stack further includes at least one of the plurality of layered images of the first dynamic range included in the first multi-view layered image stack, or references to the plurality of layered images of the first dynamic range included in the first multi-view layered image stack;

wherein the first multi-view layered image stack and the second multi-view layered image stack have been generated from the multi-view source image;

using a current view of the viewer to adjust alpha values in the set of alpha maps for the set of user pose selected sampled views to generate adjusted alpha values in a set of adjusted alpha maps for the current view;

causing a display image, derived from the set of layered images and the set of adjusted alpha maps and the set of beta scale map, to be rendered on a target image display.

12. The method of claim 11, wherein the set of user pose selected sampled views includes two or more sampled views; wherein the display image is generated by performing image blending operations on two or more intermediate images generated for the current view from the set of layered images and the set of adjusted alpha maps.

13. An apparatus performing the method recited in claim 1.

14. A non-transitory computer readable storage medium, storing software instructions, which when executed by one or more processors cause performance of the method recited in claim 1.

* * * * *